United States Patent Office 3,714,798
Patented Feb. 6, 1973

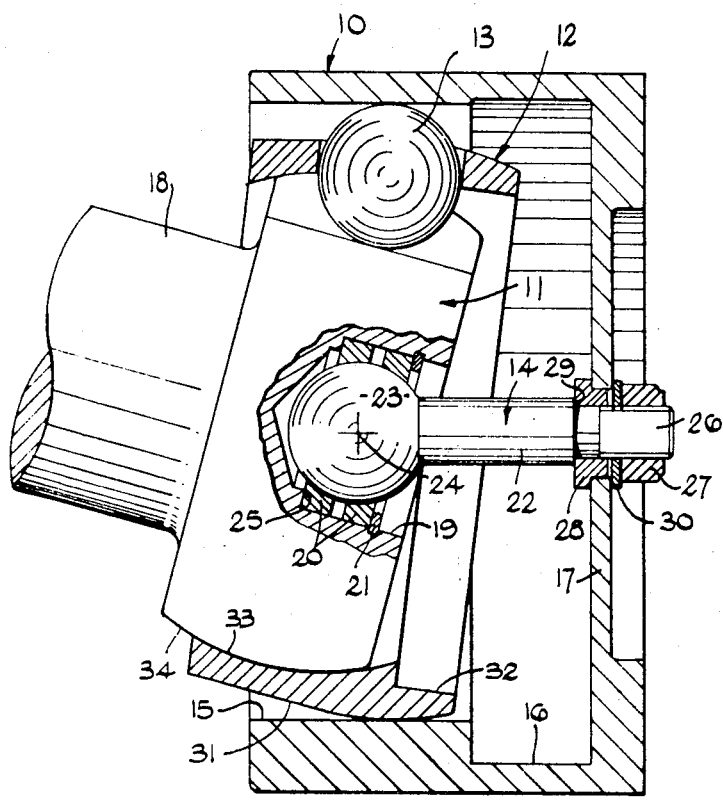

3,714,798
CONSTANT VELOCITY UNIVERSAL JOINTS
Jerzy Witold Macielinski, Warwick, England, assignor to GKN Birfield Transmissions Limited, Birmingham, England
Filed Feb. 17, 1971, Ser. No. 115,980
Claims priority, application Great Britain, Feb. 28, 1970, 9,763/70
Int. Cl. F16d 3/30
U.S. Cl. 64—21                                                5 Claims

ABSTRACT OF THE DISCLOSURE

A constant velocity universal joint includes a restraining means in the form of a ball and socket connection between the inner member and the outer member of the joint. The inner member of the joint is free to move angularly relative to the outer member but is fixed against relative axial movement by said ball and socket connection.

BACKGROUND OF THE INVENTION

Field of the invention

This invention relates to constant velocity universal joints of the kind which include inner and outer members formed with grooves which co-operate to form tracks which are angularly distributed around the joint axis and which are engaged by torque-transmitting balls which move along the grooves during relative movements between the inner and outer members, a cage member being located between the inner and outer members and serving to guide the balls into the bisector plane of the joint.

Description of the prior art

Constant velocity universal joints of the above kind are known which are constructed to accommodate relative axial movement between the inner and outer members and in which the grooves in the two members have straight axes whereby they can be formed by broaching. The axes of the grooves may either be parallel to the axes of the members or of helical form.

It is an object of the present invention to provide an improved form of such joint in which relative axial movement between the joint members is prevented.

It is a further object of the invention to provide a method of manufacturing both joints in which relative axial movement between the inner and outer members is permitted and joints in which no axial movement between the inner and outer members is permitted, such method involving considerable reduction in the total number of components required.

SUMMARY OF THE INVENTION

A restraining means formed separate from the outer member and from the inner member acts between the outer member and the inner member to prevent relative axial movement between the outer member and the inner member in at least one direction.

BRIEF DESCRIPTION OF THE DRAWING

The single figure of the drawing is a sectional view of a constant velocity universal joint, the section being taken such that, at the top thereof, the outer member and cage are sectioned at a ball centre position whereas, at the bottom thereof, the outer member and cage are sectioned at a position between adjacent balls.

DESCRIPTION OF A PREFERRED EMBODIMENT

As shown in the drawing, the joint includes an outer member 10, an inner member 11, a cage 12 formed with six equi-angularly spaced apertures in which balls 13 are received and restraining means indicated generally as 14. The outer member 10 is formed with a closed bore which, for a first portion 15 of its length is of cylindrical form and said cylindrical portion 15 is located adjacent a further cylindrical portion 16 which is of increased internal diameter as compared with said portion 15. The first bore portion 15 is formed with longitudinally extending grooves which are of generally part-cylindrical cross-section.

The inner end of the bore in the outer member 10 is closed by an end wall 17 of the outer member and at the other end of the bore sealing means (not shown) are provided in the form of a flexible gaiter which extends between the outer member 10 and a shaft 18 which is formed integrally with the inner member 11.

As shown the shaft 18 and inner member 11 are integral though in an alternative construction the inner member 11 is formed separate from the shaft 18 and has a splined driving connection with the shaft.

As shown the inner member 11 is formed with a central blind bore 19 within which a pair of bearing elements 20 are located, the bearing elements 20 being located in spaced relationship and the outer bearing element 20 is held in position by means of a spring clip 21.

In the alternative construction referred to above the shaft will be formed with a central blind bore to receive the bearing elements 20.

The restraining means 14 includes a stem portion 22 and a head portion 23. The head portion 23 is of part-spherical form and the centre of curvature thereof is a point 24 which is the joint centre. The bearing elements 20 have part-spherical surfaces which are concentric with the outer surface of the head portion 23 and the inner bearing element 20 is fixed by its engagement with a shoulder 25 in the bore 19. The stem 22 of the restraining means 14 has a threaded end portion 26 and a fastener 27 is tightened onto said threaded end portion 26 to fix the stem portion 22 to the end wall 17. The end wall 17 is formed with an aperture in which a locating flanged collar 28 is fitted, the flanged collar 28 abutting a shoulder 29 on the stem portion 22 and a washer 30 is interposed between the collar 28 and the threaded fastener 27. The restraining means 14 which is formed separate from the outer member 10 is thus fixed against movement relative to the outer member 10 and the head portion 23 is thus maintained with its centre of curvature 24 at the joint centre, the engagement of the head portion 23 with the bearing elements 20 serving to maintain the inner member 11 against axial movement relative to the outer member 10.

The cage 12 is constructed as described in U.S. patent specification No. 3,464,232, and has a part-spherical outer surface 31 which has its centre of curvature off-set relative to the centre of the joint. Said cage outer surface 31 engages the cylindrical inner surface of the bore portion 15. The cage 12 is counterbored at 32 to provide a counterbore which, as explained in specification No. 3,464,232, serves to facilitate assembly of the cage 12 and inner member 11.

The cage 12 has a part-spherical inner surface 33 which has its centre of curvature off-set from the joint centre 24 by an amount equal and opposite to that of the centre of curvature of the cage outer surface 31. The part-spherical inner surface 33 of the cage 12 mates with a part-spherical outer surface 34 of the inner member 11 and this off-set centres arrangement serves, as fully described in specification No. 3,464,232, to ensure that, during joint articulation, the cage 12 moves in such way as to maintain the centres of the balls 13 in the bisector plane of the joint.

The joint components are so formed that, if the restraining means 14 were to be removed or were not provided, the inner member 11 would be free to move axially relative to the outer member 10 and the joint would still function as a constant velocity universal joint.

The cage 12, the inner member 11 and the outer member 10 are so constructed that, where a manufacturer wishes to produce both fixed and plunging constant velocity universal joints, the number of separate components which he has to manufacture is reduced, i.e. if a manufacturer wished to produce a plunging constant velocity universal joint as well as the fixed joint shown in the drawing he would merely omit the restraining means 14.

I claim:

1. In a constant velocity universal joint of the kind which includes inner and outer members formed with grooves which define track means angularly distributed around the axis of the joint, and torque-transmitting balls engaged in the track means and movable therealong to permit relative angular movement between the inner and outer members, the improvement which comprises cage means for maintaining the balls in the bisector plane of the joint, said cage means and said track means providing intrinsically for relative axial movement between the inner and outer members, restraining means acting between the inner and outer members to prevent such relative axial movement and releasable securing means connecting the restraining means to the inner and outer members, whereby retention or release of said securing means permits the joint to operate selectively as a non-plunging joint or a plunging joint.

2. A constant velocity universal joint as claimed in claim 1 wherein the outer member has a wall closing an end thereof and wherein the restraining means comprises a member having a stem portion and a head portion which has a part-spherical outer surface engaging a part-spherical inner surface of bearing means, said part-spherical surfaces being concentric with their centres at the centre of the joint, said stem portion and said bearing means being connected to the said wall and the inner member respectively by the releasable securing means.

3. A constant velocity universal joint as claimed in claim 2 wherein the bearing means are located within a bore provided in the inner member and are held therein by removable clip means.

4. A constant velocity universal joint as claimed in claim 2 wherein the stem portion of the restraining member extends through an aperture in the said wall and is screw threaded to receive a threaded fastener securing the member to the wall.

5. A constant velocity universal joint as claimed in claim 1 wherein the outer member has a cylindrical bore and the grooves of said member are constituted by straight longitudinally extending grooves formed in said bore; the inner member has a part-spherical outer surface and the grooves of said member are constituted by longitudinally extending grooves formed in said surface; and the cage means comprise a cage member located between the inner and outer members and provided with apertures in which the torque-transmitting balls are located, said cage member having part-spherical inner and outer surfaces which respectively engage the part-spherical surface of the inner member and the cylindrical bore of the outer member and which have centres of curvature offset by an equal amount on opposite sides of the joint centre along the joint axis when the inner and outer members are aligned.

References Cited

UNITED STATES PATENTS 2,617,279  11/1952  Miller _____ 64—21
2,755,641  7/1956  Dunn _____ 64—21

EDWARD G. FAVORS, Primary Examiner

U.S. Cl. X.R.

64—7, 23